No. 774,182.

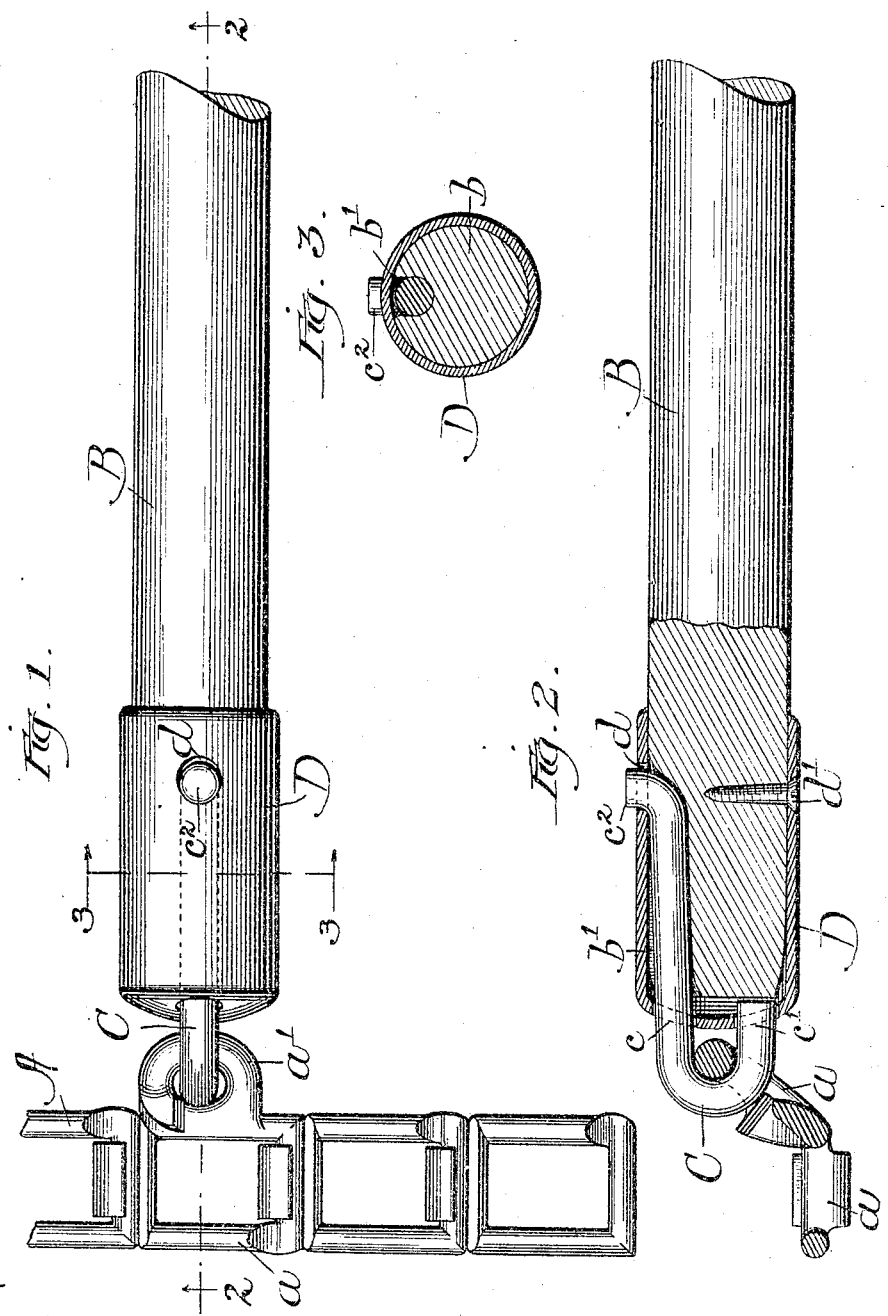

Patented November 8, 1904.

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

DRIVING CONNECTION.

SPECIFICATION forming part of Letters Patent No. 774,182, dated November 8, 1904.

Application filed January 25, 1904. Serial No. 190,434. (No model.)

*To all whom it may concern:*

Be it known that I, EDWARD A. JOHNSTON, a citizen of the United States, residing at Chicago, in the county of Cook and State of Illinois, have invented certain new and useful Improvements in Driving Connections, of which the following is a specification sufficiently clear and exact to enable those skilled in the art to which it appertains to make and use the same.

The invention relates to the means for connecting driving and driven parts, and more especially to such connections as permit a universal movement and are readily detachable and replaceable, and has for its object to provide such a connection.

An embodiment of the invention is shown in the accompanying drawings, which illustrate a fragment of a reaper-rake like that shown in my patent for reaping attachment for mowers, numbered 728,931 and dated May 26, 1903. In such a raking device it is essential that the connections between the rake-arms and the drive-chain be readily detachable, so that the parts subjected to excessive wear may be replaced or a new arm inserted in case it is broken.

Referring to the accompanying drawings, forming a part of this specification, in which like characters of reference designate like parts throughout the several views, Figure 1 is a plan view of a fragment of a reaper-rake, showing the manner of applying the invention. Fig. 2 is a sectional elevation taken on a plane indicated by line 2 2 of Fig. 1. Fig. 3 is a transverse sectional elevation taken on a plane indicated by line 3 3 of Fig. 1.

Referring to Fig. 1, A designates a fragment of the drive-chain, which is located at the inner side of the platform of the reaping attachment shown in the patent above referred to, and B the rake-arm. For every rake-arm one link of the chain, as $a$, is provided with an eye $a'$ for the connection. This connection consists of the hook-bolt C, which has the shank $c$, the hook $c'$, and the detent $c^2$ at the opposite end of the shank from the hook, and the socket D. The socket, by means of which the hook-bolt is secured to the end of the rake-arm, is provided with the opening $d$ in the side, into which the detent $c^2$ projects. It is also preferably made with one end closed except for openings for the shank $c$ and the end of the hook $c'$. The rake-arm B has one end made in cross-section corresponding to the cross-section of the socket into which it fits. This end is provided with a groove $b'$, adapted to receive the shank $c$ of the hook-bolt, whereby the detent is held in the opening $d$ and in engagement with the socket. A screw $d'$ or other suitable means serves to hold the rake-arm in position in the socket.

The operation of the invention will be evident from the above description. When it is desired to remove the rake-arm from its drive-chain, it is only necessary to remove the screw or other fastening of the socket and slip it off from the rake-arm sufficiently far to disengage the detent, when the bolt may be slipped out of the socket far enough to disengage the hook from the eye of the link or may be removed altogether. It will be readily seen that the invention is capable of many modifications without deviating from the spirit thereof. Hence it is not desired to limit it to its exact construction as herein shown. It is also adaptable to a variety of uses in connecting driving and driven parts, and therefore not to be limited to reaper-rakes.

Having thus described my invention, what I claim as new, and desire to secure by Letters Patent, is—

1. A driving connection comprising a hook-bolt, a detent therefor, a socket and means for holding said bolt and socket in operative relation through the agency of said detent.

2. In a driving connection, the combination of a hook-bolt, a detent therefor, a socket, an opening in said socket for said detent and means for holding said detent in said opening to maintain said bolt and socket in operative relation.

3. In a driving connection, the combination of a hook-bolt comprising a hook, a shank and a detent, a socket carrying said bolt, provided with openings for said hook, shank and detent, and means for holding said detent in engagement with said socket.

4. In a driving connection, in combination with driving and driven parts, a bolt having a universal connection with one of said parts, a detent for said bolt, a socket rigidly connected with the other of said parts whereby said detent is held in engagement with said socket.

5. In a driving connection, in combination with the drive-chain and the rake-arm of a reaper-rake, an eye integral with a link of said chain, a hook-bolt having a universal connection with said eye, a detent for said bolt and a socket rigidly secured to said rake-arm whereby said detent is held in engagement with said socket to maintain the parts in their operative relations.

In testimony whereof I have signed my name to this specification in the presence of two subscribing witnesses.

EDWARD A. JOHNSTON.

Witnesses:
   A. E. CHADWICK,
   WILLIAM WEBBER.